(12) United States Patent
Hoshikawa

(10) Patent No.: US 8,588,510 B2
(45) Date of Patent: Nov. 19, 2013

(54) IMAGE PROCESSING APPARATUS AND IMAGE PROCESSING METHOD

(75) Inventor: Kazumi Hoshikawa, Toyohashi (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 70 days.

(21) Appl. No.: 13/238,604

(22) Filed: Sep. 21, 2011

(65) Prior Publication Data

US 2012/0093363 A1    Apr. 19, 2012

(30) Foreign Application Priority Data

Oct. 13, 2010 (JP) ................................ 2010-230162

(51) Int. Cl.
*G06K 9/00* (2006.01)

(52) U.S. Cl.
USPC ............ 382/145; 382/149; 382/150; 382/147

(58) Field of Classification Search
None
See application file for complete search history.

(56) References Cited

U.S. PATENT DOCUMENTS

| | | | |
|---|---|---|---|
| 7,136,541 B2 * | 11/2006 | Zhang et al. | 382/300 |
| 7,200,259 B1 * | 4/2007 | Gold et al. | 382/149 |
| 8,345,979 B2 * | 1/2013 | Davis | 382/181 |

FOREIGN PATENT DOCUMENTS

JP    2006-148351 A    6/2006

OTHER PUBLICATIONS

NPL—Machine Translation of Applicant Admitted Prior Art, Japan Application No. 2006-148351.*

* cited by examiner

*Primary Examiner* — David Zarka
*Assistant Examiner* — Ha Le
(74) *Attorney, Agent, or Firm* — Foley & Lardner LLP

(57) ABSTRACT

When a detection-target subject is imaged with an image pickup device having line-defect pixels, the detection-target subject is imaged, with the image pickup device or the detection-target subject rotated at a predetermined angle so that the edge of one side of the detection-target subject is not parallel to each of horizontal and vertical scanning lines of the image pickup device, and a gray-scale image is captured by a control apparatus. In the gray-scale image, the luminance of each of the line-defect pixels is corrected by interpolation with luminances of pixels adjacent to both sides of the line-defect pixel. The gray-scale image is subjected to sub-pixel processing to detect the edge of the detection-target subject. When the detection-target subject is a component in a rectangular shape, rotation is made so that four sides are not parallel to each of the horizontal and vertical scanning lines of the image pickup device.

3 Claims, 8 Drawing Sheets

CORRECTION OF LINE DEFECT BY INTERPOLATION

| A0 | A1 | (A1+A2)/2 | A2 | A3 |
|---|---|---|---|---|
| B0 | B1 | (B1+B2)/2 | B2 | B3 |
| C0 | C1 | (C1+C2)/2 | C2 | C3 |
| (C0+D0)/2 | (C1+D1)/2 | (C1+C2+D1+D2)/4 | (C2+D2)/2 | (C3+D3)/2 |
| D0 | D1 | (D1+D2)/2 | D2 | D3 |
| E0 | E1 | (E1+E2)/2 | E2 | E3 |
| F0 | F1 | (F1+F2)/2 | F2 | F3 |

← LINE DEFECT

↑ LINE DEFECT

FIG. 2

GRAY-SCALE IMAGE BEFORE CORRECTION BY INTERPOLATION (No. 1)

EDGE OF DETECTION-TARGET SUBJECT  LINE DEFECT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 3

GRAY-SCALE IMAGE BEFORE CORRECTION BY INTERPOLATION (No. 2)

EDGE OF DETECTION-TARGET SUBJECT    LINE DEFECT

| 0 | 0 | 0   | 0   | 0   | 0   | 0   | 0   | 0 | 0 |
|---|---|-----|-----|-----|-----|-----|-----|---|---|
| 0 | 0 | 0   | 0   | 0   | 0   | 0   | 0   | 0 | 0 |
| 0 | 0 | 0   | 0   | 0   | 0   | 0   | 0   | 0 | 0 |
| 0 | 0 | 0   | 0   | 0   | 0   | 0   | 0   | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 0   | 0   | 0   | 0   | 0   | 0   | 0 | 0 |
| 0 | 0 | 0   | 0   | 0   | 0   | 0   | 0   | 0 | 0 |

FIG. 4

GRAY-SCALE IMAGE AFTER CORRECTION BY INTERPOLATION

POSITION OF EDGE AFTER SUB-PIXEL PROCESSING

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 128 | 128 | 128 | 128 | 128 | 128 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

FIG. 5

GRAY-SCALE IMAGE BEFORE CORRECTION BY INTERPOLATION
AFTER ROTATION OF IMAGE PICKUP DEVICE

LINE DEFECT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 255 | 255 | 0 | 0 | 0 | 0 | 0 | 0 |
| 0 | 0 | 0 | 0 | 0 | 0 | 0 | 0 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 0 | 0 | 255 | 255 | 255 | 255 | 0 | 0 |
| 0 | 0 | 0 | 0 | 0 | 0 | 255 | 255 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

EDGE

FIG. 6

GRAY-SCALE IMAGE AFTER CORRECTION BY INTERPOLATION
AFTER ROTATION OF IMAGE PICKUP DEVICE

POSITION OF EDGE AFTER SUB-PIXEL PROCESSING

LINE DEFECT

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 255 | 255 | 0 | 0 | 0 | 0 | 0 | 0 |
| 0 | 0 | 255 | 255 | 128 | 128 | 128 | 128 | 0 | 0 |
| 0 | 0 | 255 | 255 | 255 | 255 | 255 | 255 | 0 | 0 |
| 0 | 0 | 255 | 255 | 255 | 255 | 255 | 255 | 0 | 0 |
| 0 | 0 | 0 | 0 | 255 | 255 | 255 | 255 | 0 | 0 |
| 0 | 0 | 0 | 0 | 0 | 0 | 255 | 255 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

EDGE

FIG. 7

IMAGE PROCESSING APPARATUS AND IMAGE PROCESSING METHOD

BACKGROUND OF THE INVENTION

1. Field of the Invention

The present invention relates to an image processing apparatus and image processing method of performing sub-pixel processing on a gray-scale image obtained by imaging a detection-target subject with an image pickup device to detect an edge of the detection-target subject.

2. Description of the Related Art

Some image pickup devices, such as CMOS sensors, have a line defect in either one or both of horizontal and vertical directions. With an increase in size of an image pickup device (an increase in the number of pixels), the ratio of image pickup devices having a line defect is increasing. If these image pickup devices having a line defect are all taken as defective pieces, yields are decreased as the size of the image pickup device is increased, thereby increasing production cost. For this reason, image pickup devices having a line defect are also used in image processing apparatuses.

However, since an imaged signal cannot be captured at a portion with a line defect in an image pickup device, if an edge of detection-target subject overlaps the line-defect portion, the edge of the detection-target subject cannot be accurately detected.

As a measure to address the problem, as described in Japanese Unexamined Patent Application Publication No. 2006-148351, the image pickup device or the detection-target subject is configured to be rotated about a predetermined axis at a predetermined angle, and data of a defective pixel in an imaged image obtained by imaging with the image pickup device before rotation at the predetermined angle is replaced by data of a corresponding pixel in the imaged image obtained by imaging with the image pickup device after rotation at the predetermined angle, thereby performing data correction on the defective pixel.

However, in the defective-pixel correcting method described in the gazette above, imaging is required to be performed twice for image processing on one detection-target subject, disadvantageously taking a long time for image processing and decreasing productivity.

SUMMARY OF THE INVENTION

To solve the problem above, in a measure as depicted in FIG. 2, the luminance of the line-defect pixel is corrected by interpolation with the luminances of pixels adjacent to both sides of the line-defect pixel.

For example, in the case of a line defect in a vertical direction, when the luminances of pixels adjacent to left and right sides of the line-defect pixel are A1 and A2, the luminance of the line-defect pixel is (A1+A2)/2 after correction by interpolation. In the case of a line defect in a horizontal direction, when the luminances of pixels adjacent to upper and lower sides of the line-defect pixel are C0 and D0, the luminance of the line-defect pixel is (C0+D0)/2 after correction by interpolation.

Therefore, when an edge of the detection-target subject overlaps with line-defect pixels as depicted in FIG. 3 or when the edge of the detection-target subject is adjacent to line-defect pixels as depicted in FIG. 4, the luminance of each of the line-defect pixels overlapping the edge of or adjacent to the detection-target subject is an intermediate luminance of 128 between a luminance of 0 (black) and a luminance of 255 (white) adjacent to both sides of the line-defect pixels:

Luminance of the line-defect pixel=(0+255)/2=128.

In this case, as depicted in FIG. 5, a portion of edge of the detection-target subject overlapping or adjacent to the line-defect pixels is positioned according the luminances of the line-defect pixels due to sub-pixel processing (for example, in the case of an intermediate luminance of 128, the portion is positioned at the center of the line-defect pixels). Therefore, the position of the edge of the detection-target subject appears to be shifted by 0.5 pixel at maximum from an actual state. This causes deterioration in accuracy of detecting the edge of the detection-target subject.

Thus, an object of the present invention is to provide a system that performs sub-pixel processing on a gray-scale image obtained by imaging a detection-target subject with an image pickup device having line-defect pixels to detect an edge of the detection-target subject, in which the edge of the detection-target subject can be accurately detected with one imaging and edge detection accuracy can be improved by narrowing a range where an edge detection error occurs due to correction of the line-defect pixels by interpolation.

To achieve the object above, in the present invention, in an image processing apparatus detecting an edge of a detection-target subject imaged by an image pickup device having line-defect pixels, the apparatus is configured to include: rotating means rotating the image pickup device or the detection-target subject; imaging control means imaging the detection-target subject with the image pickup device, with the image pickup device or the detection-target subject being rotated by the rotating means at a predetermined angle so that the edge of the detection-target subject is not parallel to each of horizontal and vertical scanning lines of the image pickup device; and image processing means detecting the edge of the detection-target subject by performing sub-pixel processing on a gray-scale image obtained by performing correction by interpolation on a luminance of each of the line-defect pixels with luminances of pixels adjacent to both sides of the line-defect pixel.

In this structure, the image pickup device or the detection-target subject is rotated at the predetermined angle so that the edge of the detection-target subject is not parallel to each of the horizontal and vertical scanning lines of the image pickup device. Therefore, even if a line defect is present in the image pickup device, the detection-target subject can be imaged with rotation being made so that the line defect and the edge of one side of the detection-target subject are not parallel to each other. With this, the entire edge of one side of the detection-target subject can be prevented from overlapping or being adjacent to the line-defect pixels, a range in which the edge of the detection-target subject overlaps or is adjacent to the line-defect pixels can be narrowed, and an edge range for correction by interpolation can be narrowed. With this, a range in which an edge detection error occurs due to correction of the line-defect pixels by interpolation can be narrowed, and edge detection accuracy can be improved. Moreover, since the edge can be accurately detected with one imaging, a decrease in productivity can be prevented.

Specifically, in the present invention, when the detection-target subject is in a rectangular shape and the edges of four sides of the detection-target subject are detected, rotation is made at the predetermined angle so that the four sides are not parallel to each of the horizontal and vertical scanning lines of the image pickup device. With this, the detection-target subject can be imaged with rotation being made so that any of the edges of the four sides of the detection-target subject is not parallel to the line defect.

Also, when bumps of a BGA-type component are taken as the detection-target subject and the edge of each of the bumps is detected, rotation is made at the predetermined angle so that an arrangement of the bumps in longitudinal, lateral, and diagonal directions of the BGA-type component is not parallel to each of the horizontal and vertical scanning lines of the image pickup device. With this, the arrangement of the bumps of the BGA-type component can be imaged with rotation being made so that the arrangement of the bumps in the longitudinal, lateral, and diagonal directions are not parallel to the line defect, and accuracy of detecting the arrangement of the bumps can be improved.

BRIEF DESCRIPTION OF THE DRAWINGS

FIG. 2 is a diagram for describing a method of performing correction by interpolation on a luminance of a line defect pixel of an image pickup device;

FIG. 3 is a diagram of an example of a gray-scale image before correction by interpolation when the entire edge of one side of a detection-target subject overlaps line-defect pixels;

FIG. 4 is a diagram of an example of a gray-scale image before correction by interpolation when the entire edge of one side of a detection-target subject is adjacent to line-defect pixels;

FIG. 5 is a diagram of an example of a gray-scale image after correction by interpolation when the entire edge of one side of a detection-target subject overlaps or is adjacent to line-defect pixels;

FIG. 6 is a diagram of an example of a gray-scale image before correction by interpolation obtained by imaging with an image pickup device being rotated at a predetermined angle;

FIG. 7 is a diagram of an example of a gray-scale image after performing correction by interpolation on luminances of the line-defect pixels of the gray-scale image of FIG. 6 and performing sub-pixel processing.

DETAILED DESCRIPTION OF THE PREFERRED EMBODIMENTS

Two embodiments obtained by applying modes for implementing the present invention to a component mounting apparatus for embodiment are described below.

First Embodiment

A first embodiment of the present invention is described based on FIG. 1 to FIG. 7.

Figure 1:
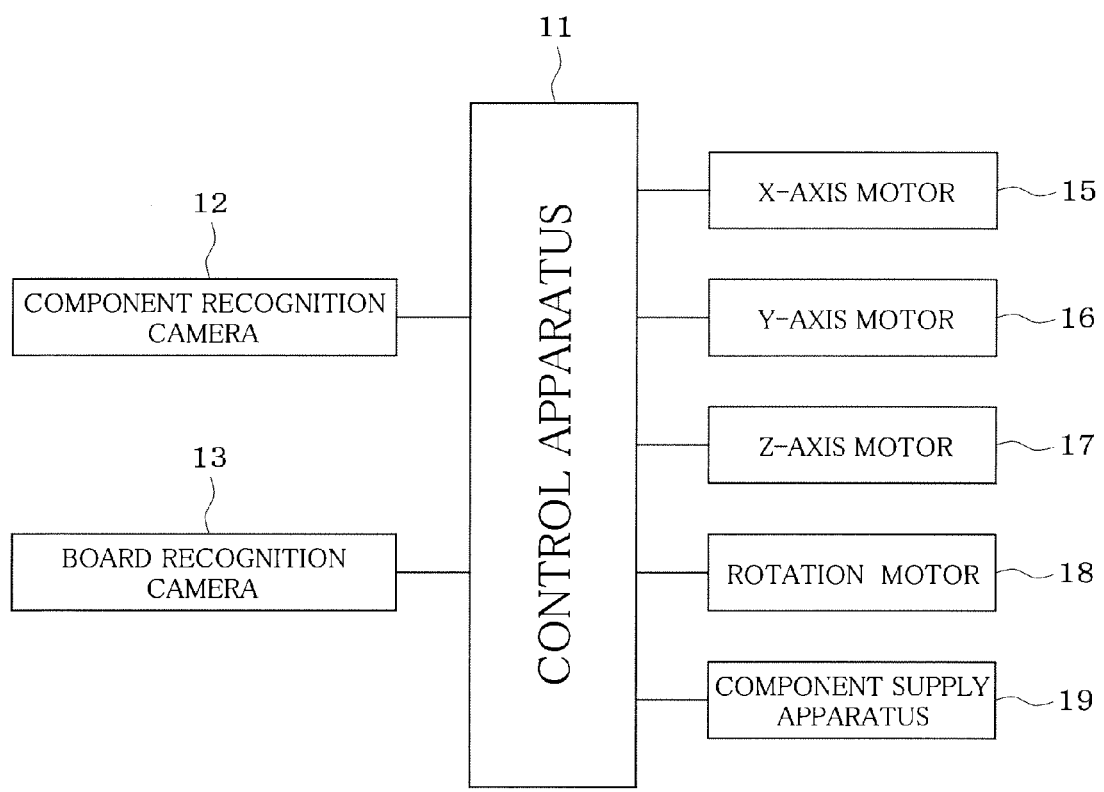
FIG. 1 is a block diagram of the structure of a component mounting apparatus in a first embodiment of the present invention.

First, the entire structure of a component mounting apparatus is schematically described based on FIG. 1.

To a control apparatus 11 of the component mounting apparatus, a component recognition camera 12 imaging a component sucked at a suction nozzle (not shown) and a board recognition camera 13 imaging a reference position mark, component mount state, and others of a circuit board on which the component is to be mounted are connected. Each of the cameras 12 and 13 has an image pickup device, such as a CMOS sensor or a CCD sensor, incorporated therein.

During operation of the component mounting apparatus, the control apparatus 11 functioning as imaging control means controls the operations of an X-axis motor 15, a Y-axis motor 16, a Z-axis motor 17, and a rotation motor 18 (rotating means) driving a mount head (not shown) holding the suction nozzle in an X-axis direction, a Y-axis direction, a Z-axis direction, and a θ direction, respectively, thereby causing a component (a detection-target subject) supplied from a component supply apparatus 19 to be sucked by the suction nozzle, causing the component to be imaged by the component recognition camera 12, causing the edge of the sucked component to be detected based on a image processing to recognize the outer shape of the component and determine the type, suction posture, and others, and causing the suction nozzle to move onto the circuit board to mount the component on the circuit board.

In this case, the component recognition camera 12 is configured by using an image pickup device, such as a CMOS sensor, where a line defect(s) in a horizontal and/or vertical direction is present. Therefore, in the first embodiment, as depicted in FIG. 2, the luminance of each of the line-defect pixels is corrected by interpolation with the luminances of pixels adjacent to both sides of the line-defect pixel. For example, in the case of a line defect in a vertical direction, when the luminances of pixels adjacent to left and right sides of the line-defect pixel are C1 and C2, the luminance of the line-defect pixel is (C1+C2)/2 after correction by interpolation. In the case of a line defect in a horizontal direction, when the luminances of pixels adjacent to upper and lower sides of the line-defect pixel are C1 and D1, the luminance of the line-defect pixel is (C1+D1)/2 after correction by interpolation.

Furthermore, as depicted in FIG. 5, a portion of the edge of the detection-target subject overlapping or adjacent to the line-defect pixels is positioned according to the luminances of the line-defect pixels due to sub-pixel processing (for example, in the case of an intermediate luminance of 128, the portion is positioned at the center of the line-defect pixels). Therefore, the position of the edge of the detection-target subject appears to be shifted by 0.5 pixel at maximum from an actual state. This causes deterioration in accuracy of detecting the edge of the detection-target subject To get around this, in the first embodiment, the control apparatus 11 controls the rotation motor 18 to cause the detection-target subject to be imaged, as depicted in FIG. 6, with the component recognition camera 12 having the image pickup device being rotated at a predetermined angle so that the edge of one side of the detection-target subject is not parallel to each of horizontal and vertical scanning lines of the image pickup device, to capture a gray-scale image. Then, as depicted in FIG. 7, the gray-scale image is subjected to correction of the luminance of each of the line-defect pixel by interpolation with the luminances of pixels adjacent to both sides of the line-defect pixel, and is subjected to sub-pixel processing, thereby detecting the edge of the detection-target subject. Note that interpolation may be linear interpolation or interpolation with any appropriate curve.

In this case, when the detection-target subject is in a rectangular shape and edges of four sides of the detection-target subject are detected, rotation is made at the predetermined angle so that the four sides are not parallel to each of the horizontal and vertical scanning lines of the image pickup device. With this, the detection-target subject can be imaged with rotation being made so that any of the edges of the four sides of the detection-target subject is not parallel to the line defect. When the detection-target subject is a component in a rectangular shape, the rotation angle is set so that a crossing angle between any edge of the detection-target subject and the line-defect pixel (in a horizontal or vertical direction of the image pickup device) is within a range of, for example, 20 degrees to 70 degrees, more preferable, 35 degrees to 55 degrees. The most preferable crossing angle is 45 degrees.

As depicted in FIG. 3 and FIG. 4, when the entire edge of one side of the detection-target subject overlaps or is adjacent to line-defect pixels, an edge range for correction by interpolation includes six pixels in an example of FIG. 5. By contrast, as depicted in FIG. 6, when the image pickup device is rotated at the predetermined angle for imaging, in an example of FIG. 7, an edge range for correction by interpolation includes four pixels.

As such, by imaging with the image pickup device being rotated at the predetermined angle, a range in which the edge of the detection-target subject overlaps or is adjacent to the line-defect pixels can be narrowed, and an edge range for correction by interpolation can be narrowed. With this, a range in which an edge detection error occurs due to correction of the line-defect pixels by interpolation can be narrowed, and edge detection accuracy can be improved. Moreover, since the edge can be accurately detected with one imaging, a decrease in productivity can be prevented.

While the component recognition camera 12 having the image pickup device is rotated at the predetermined angle in the first embodiment described above, it is needless to say that the detection-target subject may be rotated at the predetermined angle.

Second Embodiment

Figure 8:
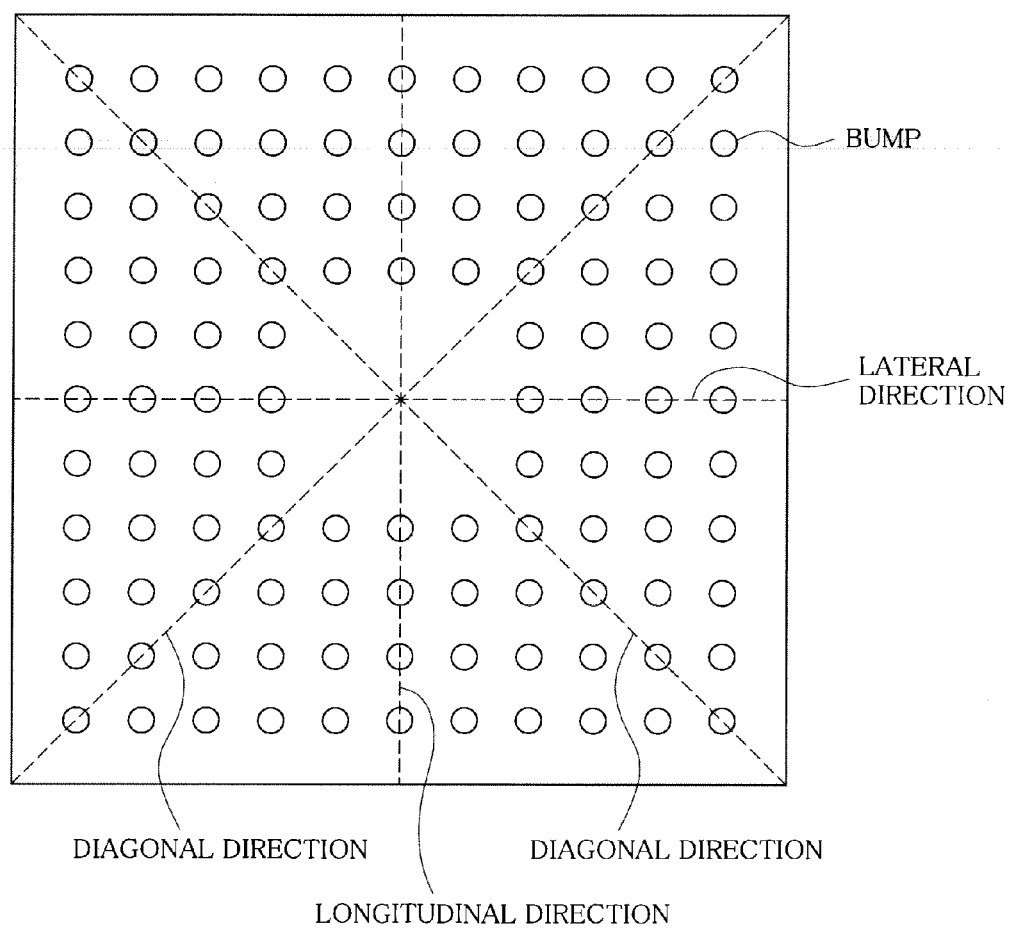
FIG. 8 is a diagram of an example of an arrangement of bumps of a BGA-type component as a detection-target subject of a second embodiment.

In a second embodiment of the present invention, bumps of a BGA-type component as depicted in FIG. 8 are taken as the detection-target subject. When the arrangement of the bumps of the BGA-type component sucked at the suction nozzle is imaged from below by the image pickup device of the component recognition camera 12, the image pickup device or the BGA-type component is rotated at the predetermined angle so that the arrangement of the bumps of the BGA-type component in the longitudinal, lateral, and diagonal directions is not parallel to each of the horizontal and vertical scanning lines of the image pickup device. The rotation angle is set so that a crossing angel between each direction of arrangement of the bumps of the BGA-type component in longitudinal, lateral, and diagonal directions and the line-defect pixels (a horizontal or vertical direction of the image pickup device) is within a range of, for example, 15 degrees to 30 degrees, more preferable, 20 degrees to 25 degrees. The most preferable crossing angle is 22.5 degrees.

As in the second embodiment, if rotation is made at the predetermined angle so that the arrangement of the bumps of the BGA-type component in the longitudinal, lateral, and diagonal directions is not parallel to each of the horizontal and vertical scanning lines, the arrangement of the bumps of the BGA-type component can be imaged, with rotation being made so that the arrangement of the bumps of the BGA-type component in the longitudinal, lateral, and diagonal directions is not parallel to the line defects. With this, accuracy of detecting the arrangement of the bumps can be improved.

Note that the present invention is not restricted to the component recognition camera 12, but can be applied for implementation to the case where a reference position mark, component mount state, and others of a circuit board are imaged with the image pickup device of the board recognition camera 13 and the reference position mark, component mount state, and others are taken as a detection-target subject.

This application claims priority from Japanese Patent Application 2010-230162, filed Oct. 13, 2010, which is incorporated herein by reference in its entirety.

What is claimed is:

1. An image processing apparatus detecting an edge of a detection-target subject imaged by an image pickup device having line-defect pixels, the line-defect pixels being line defect(s) in one or both of a horizontal direction and a vertical direction, the apparatus comprising:
    rotating motor configured to rotate the image pickup device or the detection-target subject; and
    a control apparatus configured to:
        image, in a single imaging, the detection-target subject with the image pickup device, with the image pickup device or the detection-target subject being rotated by the rotating motor at a predetermined angle so that the edge of the detection-target subject is not parallel to each of horizontal and vertical scanning lines of the image pickup device, and
        detect the edge of the detection-target subject by performing sub-pixel processing on a gray-scale image obtained by performing correction by interpolation on a luminance of each of the line-defect pixels with luminances of pixels adjacent to both sides of the line-defect pixel based on the single imaging,
    wherein when bumps of a Ball Grid Array-type component are taken as the detection-target subject and an edge of each of the bumps is detected, the control apparatus is configured to rotate at the predetermined angle so that an arrangement of the bumps in longitudinal, lateral, and diagonal directions of the Ball Grid Array-type component is not parallel to each of the horizontal and vertical scanning lines of the image pickup device.

2. The image processing apparatus according to claim 1, wherein
    when the detection-target subject is in a rectangular shape and edges of four sides of the detection-target subject are detected, the control apparatus is configured to rotate at the predetermined angle so that the four sides are not parallel to each of the horizontal and vertical scanning lines of the image pickup device.

3. An image processing method of detecting an edge of a detection-target subject imaged by an image pickup device having line-defect pixels, the line-defect pixels being line defect(s) in in one or both of a horizontal direction and a vertical direction, the method comprising the steps of:
    imaging, in a single imaging, the detection-target subject with the image pickup device, with the image pickup device or the detection-target subject being rotated at a predetermined angle so that the edge of the detection-target subject is not parallel to each of horizontal and vertical scanning lines of the image pickup device; and
    detecting the edge of the detection-target subject by performing sub-pixel processing on a gray-scale image obtained by performing correction by interpolation on a luminance of each of the line-defect pixels with luminances of pixels adjacent to both sides of the line-defect pixel based on the single imaging,
    wherein when bumps of a Ball Grid Array-type component are taken as the detection-target subject and an edge of each of the bumps is detected, rotating at the predetermined angle so that an arrangement of the bumps in longitudinal, lateral, and diagonal directions of the Ball Grid Array-type component is not parallel to each of the horizontal and vertical scanning lines of the image pickup device.

* * * * *